United States Patent [19]

Galbraith

[11] Patent Number: 4,528,248

[45] Date of Patent: Jul. 9, 1985

[54] ELECTROCHEMICAL CELL AND METHOD

[75] Inventor: Andrew D. Galbraith, Los Altos, Calif.

[73] Assignee: Lockheed Missiles & Space Company, Inc., Sunnyvale, Calif.

[21] Appl. No.: 635,660

[22] Filed: Jul. 30, 1984

[51] Int. Cl.[3] .......................................... H01M 14/00
[52] U.S. Cl. .......................................... 429/8; 429/51; 429/72; 429/81; 429/206
[58] Field of Search ................. 429/70, 72, 81, 8, 206, 429/50, 51

[56] References Cited

U.S. PATENT DOCUMENTS

| | | | |
|---|---|---|---|
| 3,730,776 | 5/1973 | Seisler, Jr. | 429/51 |
| 3,791,871 | 2/1974 | Rowley | 136/100 R |
| 4,418,127 | 11/1983 | Shombaugh et al. | 429/8 |
| 4,435,487 | 3/1984 | Supelok | 429/70 |

*Primary Examiner*—Charles F. LeFevour
*Attorney, Agent, or Firm*—Wood, Dalton, Phillips, Mason, & Rowe

[57] ABSTRACT

An electrochemical cell and method whereby a reactive metal anode is contacted with an aqueous electrolyte containing the hydroxide of the anodic metal, and the electrolyte is circulated to a scrubber for contact with carbon dioxide. In the scrubber, the precipitable carbonate of the anodic metal is formed, thereby reducing the metal hydroxide concentration in the electrolyte. The metal carbonate is separated from the electrolyte and the electrolyte is recirculated to the cell.

14 Claims, 1 Drawing Figure

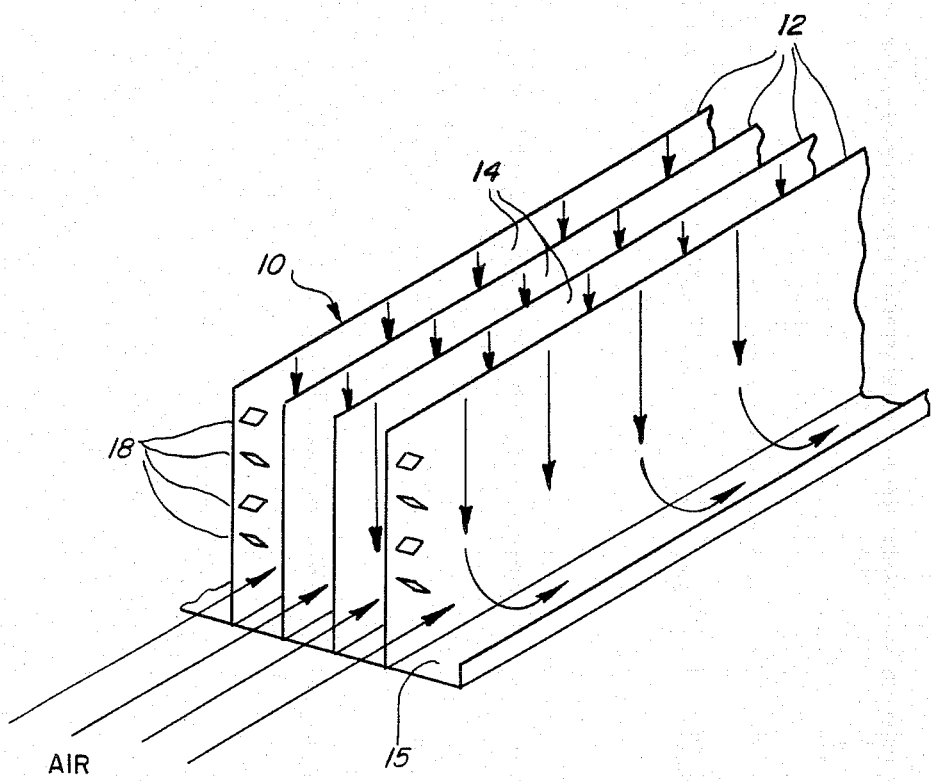

ELECTROCHEMICAL CELL AND METHOD

BACKGROUND OF THE INVENTION

1. Field of the Invention

This invention relates generally to electrochemical cells and, more particularly, this invention relates to a reactive metal/aqueous electrolyte electrochemical cell including means for stabilizing the electrolyte concentration.

2. Description of the Prior Art

The use of lithium and other highly reactive metals, such as so-called "light metals", as anode materials in electrochemical cells is well known. See for example, Rowley U.S. Pat. No. 3,791,871 (Feb. 24, 1974), the disclosure of which is incorporated herein by reference. Electrical energy is provided by the electrochemical reaction of the anodic metal with an aqueous electrolyte.

Often, an oxidizer such as hydrogen peroxide is present in the cell, and the overall reaction can be written, in the case of a lithium anode, as follows:

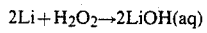
$$2Li + H_2O_2 \rightarrow 2LiOH(aq)$$

Where an air cathode is employed the reaction can be written:

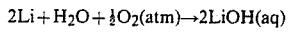
$$2Li + H_2O + \tfrac{1}{2}O_2(atm) \rightarrow 2LiOH(aq)$$

As indicated in the foregoing equations, the anodic reaction product in lithium/aqueous electrolyte cells is lithium hydroxide. Optimally (at typical operation temperatures), the concentration of lithium hydroxide in the electrolyte is maintained at about 4.2 molar. As the lithium hydroxide concentration rises, power diminishes correspondingly, and passivation of the anode occurs if the electrolyte becomes saturated with lithium hydroxide.

Therefore, steps must be taken to maintain the lithium hydroxide concentration in the electrolyte at a level at which useful electrical current is produced.

For example, water can be added to dilute the electrolyte. This method can be especially advantageous in marine environments where water is plentiful. In non-marine environments water for dilution must be carried with the cell. This added weight diminishes the energy output per unit weight of the cell.

Precipitation of the hydroxide by cooling or by the use of precipitants is possible but generally results in the formation of $LiOH.H_2O$. One water molecule is removed from the system for each lithium hydroxide molecule, necessitating the provision of extra water, thereby increasing the weight of the cell.

SUMMARY OF THE INVENTION

The present invention is directed to overcoming one or more of the problems set forth above.

According to the present invention, an electrochemical cell comprises a lithium or other reactive metal anode, a cathode spaced from the anode, and an electrolyte comprising an aqueous solution of the hydroxide of the anodic metal. The electrolyte is circulated from the electrochemical reaction zone defined by the anode and cathode to gas/liquid contact means, such as a scrubber, where the electrolyte is contacted with carbon dioxide, preferably provided by atmospheric air. The carbon dioxide reacts with the metal hydroxide to form the precipitable carbonate of the metal. The electrolyte then flows to a suitable separator where the carbonate is removed. The hydroxide concentration of the electrolyte is thus reduced, and the electrolyte is recirculated to the cell reaction zone defined between the anode and cathode for continuous and efficient cell operation.

Other objects and advantages will be apparent to those skilled in the art from the following detailed description taken in conjunction with the drawing and the appended claims.

BRIEF DESCRIPTION OF THE DRAWING

The sole FIGURE is a perspective view of a preferred embodiment of a scrubber useful in accordance with the present invention.

DETAILED DESCRIPTION OF THE INVENTION

The invention contemplates an electrochemical cell with a lithium or other reactive metal anode. Any configuration of cell which operates to produce the hydroxide of the anodic metal in an aqueous electrolyte may be used with the present invention. The cell typically has a light metal anode, a cathode spaced from the anode to define an electrochemical reaction zone, an aqueous electrolyte (with or without additives), and means for circulating the electrolyte.

Lithium is the preferred anodic material because of its high energy density. Other light metals, such as other alkali metals, for example, may also be used. The metal of the anode may be present in elemental, compound, alloy or amalgam form, as desired. Reference herein to the preferred lithium is exemplary only, and the invention is understood to encompass the use of other reactive metals.

An electrochemical reaction occurs at the anode, as is well known, to produce a cation of the anodic metal, and an election. The anodic cation reacts with a negatively charged ionic specie (typically hydroxide ion) in the electrolyte to form an anodic reaction product, typically LiOH in the case of a lithium anode.

As is well known in the art, alkali metal anodes are coated with a water-soluble, metal ion permeable insulating coating of the hydrated hydroxide of the anodic metal. This coating naturally forms upon exposure of the anode to humid air, and modulates the electrochemical reaction.

The metal hydroxide coating on the anode typically effects the spacing between the anode and cathode, which may be in physical, but not direct electrical, contact with each other.

The electrolyte, containing dissolved lithium hydroxide anode reaction product, is circulated from the reaction zone of the cell (defined by the anode and cathode) to gas/liquid contact means such as a scrubber. The FIGURE depicts a wetted-wall scrubber 10. The scrubber 10 comprises a plurality of spaced parallel plates 12 and channels 14 defined therebetween in cooperation with a base plate 15. Preferably, the plates 12 are vertical, and the electrolyte is caused to flow down the plates 12.

Air, or another source of carbon dioxide, is introduced into the channels 14 so as to flow parallel to the plates 12 and thus perpendicularly to the direction of the electrolyte flow. Preferably, vanes 18 or other suitable means are disposed within the channels 14, preferably mounted on the plates 12, in order to increase air turbulence and thereby facilitate contact between air and the the electrolyte.

Carbon dioxide in the air reacts with the lithium hydroxide in the electrolyte to form lithium carbonate, as follows:

$$2LiOH + CO_2 \rightarrow Li_2CO_3 + H_2O$$

The lithium carbonate has only limited solubility in water, and its solubility decreases with increasing temperature.

The carbonate-containing electrolyte flows through suitable liquid/solid separating means (not shown), such as a filter, for removal of the carbonate. The lithium carbonate so removed can be ejected from the cell to remove unnecessary weight, or can be stored for later recovery of its lithium metal. The electrolyte can then be reused after recirculation to the cathode/anode reaction area.

The design of the scrubber can vary depending on the intended application of the cell. The importance of space, drag, power requirements, air flow rate, carbon dioxide content, etc. will vary with the type of vehicle or apparatus in which the cell is used.

The number of plates 12, as well as their height and length, are selected to provide a desired degree of scrubbing of carbon dioxide from the air. The spacing between the plates 12 is preferably in the range of about 1 to 10 cm. The spacing is selected upon consideration of the air flow rate and drag effects. When the cell is used in vehicles which require large amounts of power, it may be necessary to supplement atmospheric carbon dioxide with stored carbon dioxide in order to control the lithium hydroxide concentration during operation.

It is desirable, where possible, to place the longitudinal axis of the plates 12 parallel to the direction of motion of the vehicle. This minimizes the drag effects on the vehicle.

The evaporative cooling effects resulting from air/water contact can be used to cool the cell. In the illustrated embodiment, the plates 12 should be made of a metal or other material with a thermal conductivity which is sufficiently high for this purpose.

Water loss due to evaporation is not excessive due to the lowered vapor pressure of water in an LiOH solution. Some evaporated water can be recovered by a screen trap at the outlet of the scrubber.

Means other than the wetted-walled reactor illustrated herein may be used to contact the electrolyte with carbon dioxide in accordance with the spirit of the invention. Other types of scrubbers are well known to those skilled in the art.

If the air flow through the scrubber is too rapid the electrolyte will be blown away and the scrubber may not function properly. Therefore, it may be desirable to utilize a membrane arrangement to permit proper gas/liquid contact in applications involving high air flow rates.

The air stream which leaves the scrubber may be used as the air supply for an air cathode. If the exit gas stream is not sufficiently scrubbed of carbon dioxide for such a use, it may be circulated through an additional scrubber to more completely remove the carbon dioxide.

The inventive cell allows control of the metal hydroxide concentration in the electrolyte without excessive amounts of additional water. The carbonate-forming reaction generates one molecule of water for each molecule of lithium hydroxide, minimizing the amount of additional water required, thus maintaining the desirable energy output per unit weight of the cell.

The foregoing detailed description is given for clearness of understanding only, and no unnecessary limitations should be understood therefrom, as modifications within the scope of the invention will be obvious to those skilled in the art.

I claim:

1. An electrochemical cell, comprising:
   a reactive alkali metal anode;
   a cathode spaced from said anode to define an electrochemical reaction zone;
   an electrolyte comprising an aqueous solution of the hydroxide of said reactive metal;
   means contacting said electrolyte with carbon dioxide to form a carbonate reaction product of said metal hydroxide and said carbon dioxide;
   means for separating said reaction product from said electrolyte; and,
   means for recirculating said electrolyte from said contacting means to said reaction zone.

2. The cell of claim 1 wherein said contacting means is a scrubber comprising spaced parallel plates defining flow channels therebetween.

3. The cell of claim 2 wherein said vertical plates are aligned in a direction that is generally parallel to a direction of motion of said cell.

4. The cell of claim 2 wherein said separating means comprises a filter.

5. The cell of claim 2 further comprising means for increasing the turbulence of air flow through said scrubber.

6. The cell of claim 5 wherein said means for increasing the turbulence of said air flow are vanes disposed in said channels.

7. The cell of claim 2 wherein said plates are spaced from each other by about 1 to 10 cm.

8. The cell of claim 1 wherein said anode comprises lithium and said electrolyte is an aqueous solution of lithium hydroxide.

9. A method of generating power from an electrochemical cell comprising the steps of:
   (a) supplying an electrolyte to an electrochemical reaction zone defined between a cathode and a reactive alkali metal anode of said cell, said electrolyte comprising an aqueous solution of the hydroxide of said reactive metal;
   (b) conducting said electrolyte to a gas/liquid contacting means and reacting with carbon dioxide to form a carbonate reaction product of said metal hydroxide and said carbon dioxide;
   (c) separating said reaction product from said electrolyte; and,
   (d) recirculating said electrolyte to said reaction zone.

10. The method of claim 9 wherein said contacting means is a scrubber comprising spaced parallel plates defining flow channels therebetween.

11. The method of claim 10 wherein said electrolyte flows across the surface of said plates, and air flows in said channels in a direction generally perpendicular to the direction of flow of said electrolyte and parallel to said plates.

12. The method of claim 9 wherein said plates are constructed of a material with a thermal conductivity sufficiently high to transport heat from said electrolyte and thereby cool said cell.

13. The method of claim 9 wherein said plates are aligned in a direction that is parallel to a direction of motion of said cell.

14. The method of claim 9 wherein said anode comprises lithium and said electrolyte is an aqueous solution of lithium hydroxide.

* * * * *